United States Patent [19]
Iida

[11] Patent Number: 5,974,431
[45] Date of Patent: *Oct. 26, 1999

[54] DOCUMENT COMPOSITION SYSTEM AND METHOD FOR COMPOSING A DOCUMENT BY USING VECTOR DATA

[75] Inventor: Masahiro Iida, Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/925,064

[22] Filed: Sep. 8, 1997

Related U.S. Application Data

[63] Continuation of application No. 08/578,391, Dec. 26, 1995, abandoned, which is a continuation of application No. 08/118,748, Sep. 10, 1993, abandoned.

[30] Foreign Application Priority Data

Sep. 11, 1992 [JP] Japan ..................................... 4-242441

[51] Int. Cl.$^6$ ....................................................... G06T 1/00
[52] U.S. Cl. ........................... 707/515; 345/433; 345/439
[58] Field of Search ..................................... 345/433, 439, 345/441; 707/515, 526–7, 529–30, 540, 502

[56] References Cited

U.S. PATENT DOCUMENTS

| | | | |
|---|---|---|---|
| 4,823,303 | 4/1989 | Terasawa | 395/147 |
| 4,933,880 | 6/1990 | Borgendale et al. | 395/147 |
| 5,204,946 | 4/1993 | Shimamura | 395/777 |
| 5,212,770 | 5/1993 | Smith et al. | 395/155 |
| 5,263,136 | 11/1993 | De Aquiar et al. | 395/164 |
| 5,659,770 | 8/1997 | Yamada | 707/530 |

OTHER PUBLICATIONS

Beyer, "CRC Mathematical Tables" CRC Press Inc (1978).

Cavaoto, et al, "Inside Xerox Ventura Publisher: Version 2", Micro Publishing, pp. 111–179, 1989.

*Primary Examiner*—Joseph H. Feild
*Attorney, Agent, or Firm*—Staas & Halsey LLP

[57] ABSTRACT

A document composition system comprises a first database 4 for use in managing vector graphic data, a second database 5 for use in managing image graphic data, a registering unit 12 for cutting out graphic data created by CAD software and registering the cut-out graphic data in the first database 4, an enlarging/reducing unit 13 for enlarging or reducing graphic data read from the first database 4, restructuring the enlarged or reduced graphic data into image graphic data, and outputting the image graphic data, and a superposing unit 14 for superposing image graphic data provided by the enlarging/reducing unit 13 on image data read from the second database 5, and registering the superposed image data in the second database 5. The document composition system composes a document while fetching image graphic data from the second database 5.

9 Claims, 10 Drawing Sheets

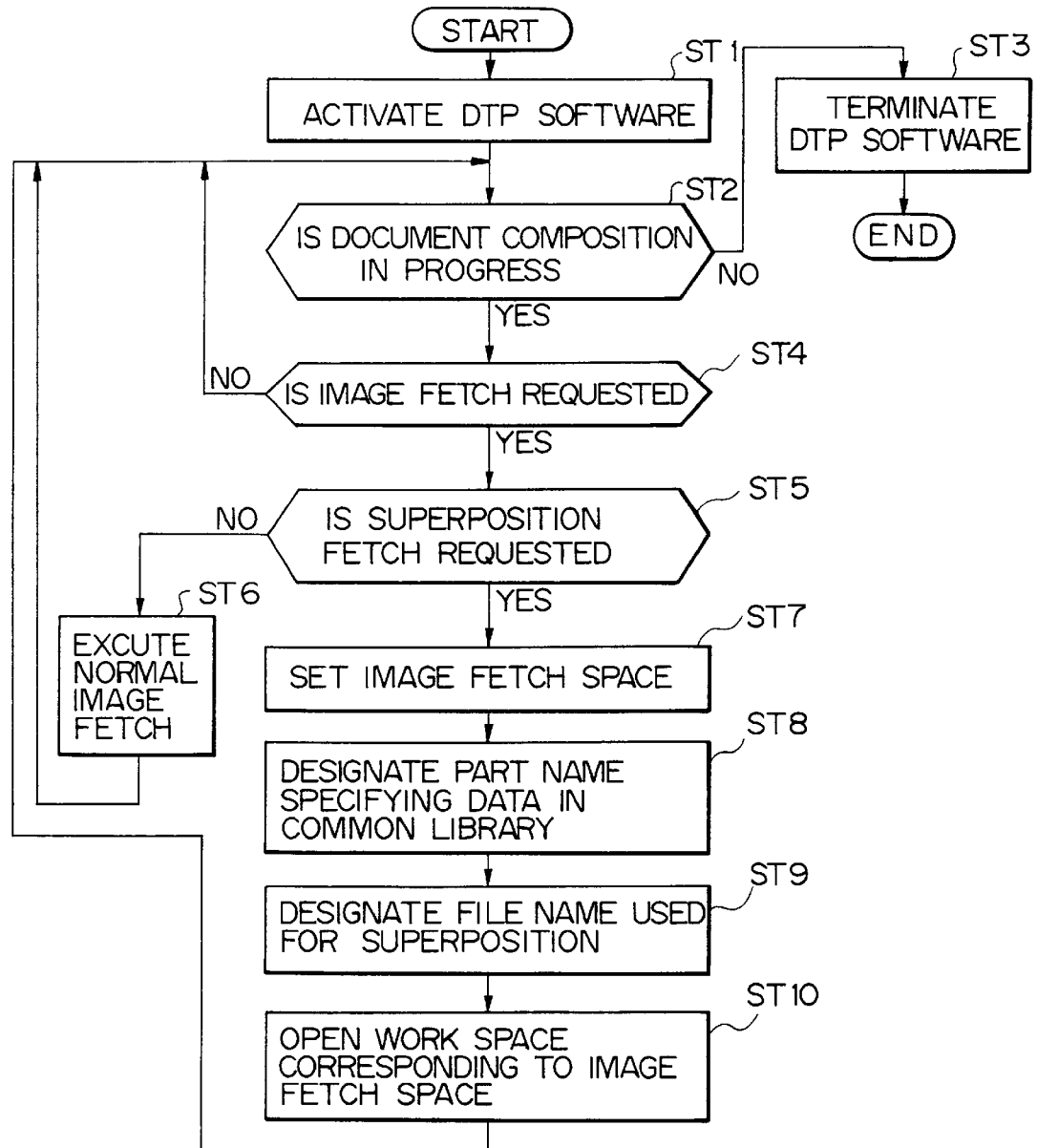

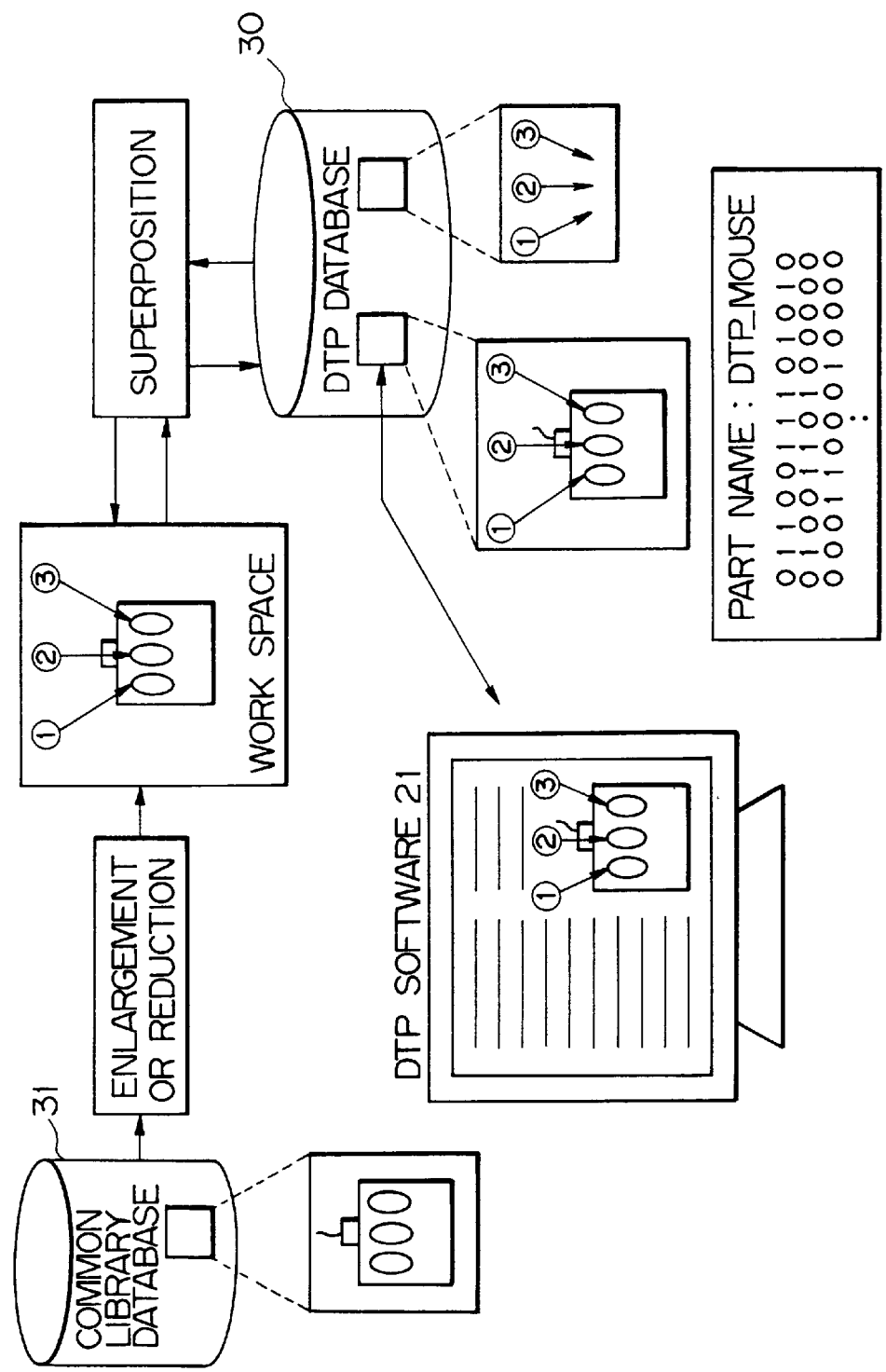

DOCUMENT COMPOSITION SYSTEM AND METHOD FOR COMPOSING A DOCUMENT BY USING VECTOR DATA

This application is a continuation of application Ser. No. 08/578,391, filed on Dec. 26, 1995, abandoned, which is a continuation of prior application Ser. No. 08/118,748, filed Sep. 10, 1993, now abandoned.

BACKGROUND OF THE INVENTION

1. Field of the Invention

The present invention relates to a document composition system under which CAD software and document composition software can run and that composes a document while fetching graphic data created by the CAD software into the document. More particularly, this invention is concerned with a document composition system capable of fetching graphic data efficiently and correctly.

In recent years, engineering workstations have gained popularity and CAD software and document composition software are often run on the same engineering workstation. An image fetch facility or one of the facilities of the document composition software is used to fetch a CAD drawing as image data, and then an engineering document is composed on the workstation. This kind of document composition system must be constructed in such a manner that graphic data created by the CAD software can be fetched into the document composition software efficiently and correctly.

2. Description of the Prior Art

In the past, graphic data for CAD drawings has been fetched into the document as follows: graphic data for CAD drawings are converted into bit map data (image data) and displayed in a display screen, a user is prompted to select any graphic data to be fetched into the document composition software from among the displayed graphic data, and then an image fetch facility fetches the selected graphic data into the document composition software.

The foregoing prior art does not pose any problem as long as the graphic data to be fetched into the document composition software need not be enlarged or reduced in size. However, if graphic data must be enlarged or reduced because it is too large or small, image data representing the graphic data must be enlarged or reduced in size. This results in extra or missing graphic elements. Thus, graphic data cannot be fetched into the document composition software correctly.

To fetch graphic data into the document composition software correctly, a time-consuming procedure must be followed: control is temporarily returned to the CAD software, the graphic data represented as vector data is enlarged or reduced to a size required by the document, and then the document composition software is activated to fetch the graphic data, which has been converted to have a desired size and represented as image data, into the document.

SUMMARY OF THE INVENTION

Accordingly, an object of the present invention is to provide a document composition system under which CAD software and document composition software can run and that composes a document while fetching graphic data created by the CAD software into the document efficiently and correctly.

According to the present invention, a document composition system, under which CAD software and document composition software can run and which composes a document while fetching graphic data created by the CAD software into the document composition software, comprises:

a first database for use in managing vector data;

a second database for use in managing image data;

a registering means for cutting-out graphic data created by the CAD software and registering cut-out data in the first database; and an enlarging/reducing means for enlarging or reducing graphic data read from the first database, restructuring the enlarged or reduced graphic data into image graphic data, and then registering the image data in the second database;

wherein the document composition system composes a document while fetching image data from the second database.

According to another aspect of the present invention, a document composition system, under which CAD software and document composition software can run and which composes a document while fetching graphic data created by the CAD software into the document composition software, comprises:

a first database for use in managing vector data;

a second database for use in managing image data;

a registering means for cutting-out graphic data created by the CAD software and registering the cut-out data in the first database;

an enlarging/reducing means for enlarging or reducing graphic data read from the first database, restructuring the enlarged or reduced graphic data into image graphic data, and then registering the image data in the second database; and a superposing means for superposing graphic data provided by the enlarging/reducing means on image data read from the second database, and registering the superposed data in the second database; wherein the document composition system composes a document while fetching image data from the second database.

BRIEF DESCRIPTION OF THE DRAWINGS

The present invention will be more clearly understood from the description set forth below with reference to the accompanying drawings.

FIG. 8, which includes FIGS. 8(a) and 8(b), shows an embodiment of a total procedure to be executed by the document composition system of the present invention; and FIG. 9 is a schematic diagram showing an example of processing executed in the document composition system of the present invention.

DESCRIPTION OF THE PREFERRED EMBODIMENTS

Figure 1:
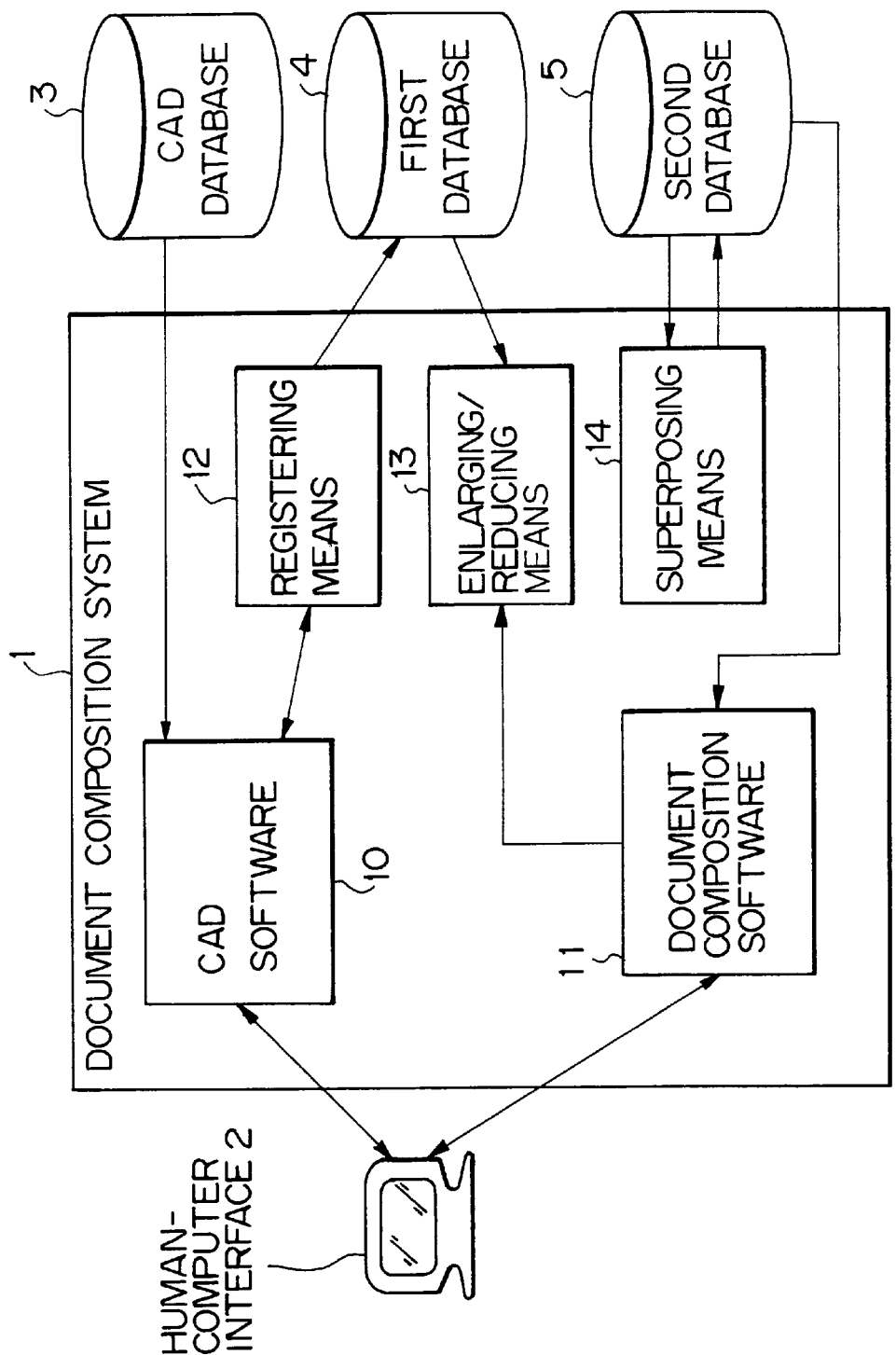
FIG. 1 shows the principle and configuration of the present invention.

FIG. 1 shows the principle and configuration of the present invention.

Reference numeral 1 denotes a document composition system in which the present invention is implemented. CAD software 10 and document composition software 11 can run on the document composition system 1. The document composition system 1 composes a document while fetching graphic data created by the CAD software into the document composition software. 2 denotes a human-computer interface installed in the document composition system 1. The human-computer interface 2 executes user-interactive processing. 3 denotes a CAD database installed in the document composition system 1. The CAD database 3 stores CAD drawing information as vector data.

Reference numeral 4 denotes a first database installed in the document composition system 1. 5 denotes a second database installed in the document composition system 1.

Reference numeral 12 denotes a registering means installed in the document composition system 1. The registering means 12 registers data in the first database 4. 13 denotes an enlarging/reducing means installed in the document composition system 1. The enlarging/reducing means 13 enlarges or reduces vector graphic data and restructures the enlarged or reduced vector graphic data into image graphic data. 14 denotes a superposing means installed in the document composition system 1. The superposing means 14 superposes image data on other image data, and registers the superposed image data in the second database 5.

In the foregoing configuration, the superposing means 14 may not be included. When the superposing means 14 is excluded, graphic data structured as image data and provided by the enlarging/reducing means 13 is registered directly in the second database 5 as indicated by dashed arrow 100.

According to the present invention, the registering means 12 interacts with the human-computer interface 2 via the CAD software 10. The registering means 12 then cuts out data required by the document composition software 11 from the graphic data created by the CAD software 10, and registers the cut-out graphic data in the first database 4.

Thus, the graphic data for CAD drawings required by the document composition software 11 (vector data) is stored in the first database 4.

The enlarging/reducing means 13 enlarges or reduces vector graphic data read from the first database 4 according to a scale factor specified by the document composition software 11, restructures the enlarged or reduced vector graphic data into image graphic data, and outputs the image graphic data. The superposing means 14 then superposes the image graphic data provided by the enlarging/reducing means 13 on associated image data read from the second database 5 (image data representing document data, graphic data, or a combination of document data and graphic data), and then registers the superposed data in the second database 5.

Thus, the second database 5 stores the superposed image graphic data required by the document composition software 11 in a size requested by the document composition software 11. If the superposing means 14 is unavailable, the second database 5 stores unit image data required by the document composition software 11 in a size requested by the document composition software 11.

The document composition software 11 composes a document while interacting with the human-computer interface 2 and fetching graphic data for CAD drawings from the second database 5 using a normal image fetch facility.

As mentioned above, according to the present invention, graphic data for CAD drawings is enlarged or reduced as vector data, restructured into image data, and then fetched into the document composition software 11. The document composition software 11 need not pass control to the CAD software 10. The document composition software 11 can therefore fetch graphic data for CAD drawings efficiently and correctly.

Graphic data for CAD drawings needed by various users can be developed as shared data in the first database 4. This also allows the document composition software 11 to fetch graphic data for CAD drawings efficiently.

When the superposing means 14 is made available, graphic data for CAD drawings can be superposed on other graphic data or graphic data can be superposed on document data. This allows the document composition software 11 to fetch graphic data in one of several formats.

The present invention will be described in detail with reference to the embodiments below.

Figure 2:
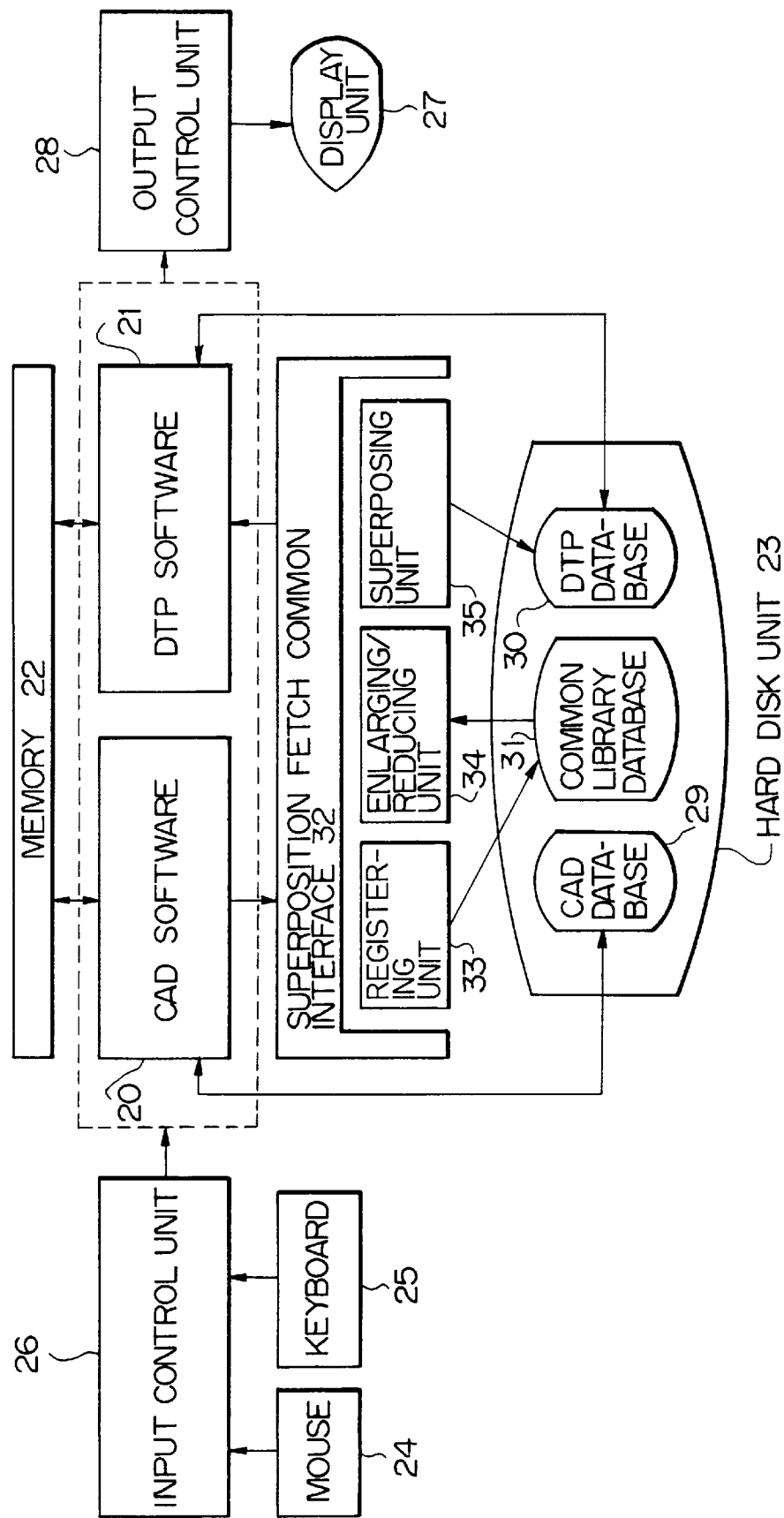
FIG. 2 shows an embodiment of a system configuration of a document composition system according to the present invention.

FIG. 2 shows an embodiment of a system configuration for a document composition system 1 according to the present invention.

In FIG. 2, reference numeral 20 denotes CAD software. 21 denotes document composition software or DTP software. 22 denotes a memory. 23 denotes a hard disk unit. 24 denotes a mouse. 25 denotes a keyboard. 26 denotes an input/output control unit. 27 denotes a display unit. 28 denotes an output control unit.

Reference numeral 29 denotes a CAD database in the hard disk unit 23. The CAD database 23 stores CAD drawing information created by the CAD software 20 and structured as vector data. 30 denotes a DTP database in the hard disk unit 23. The DTP database 30 stores graphic and document data referenced by the DTP software 21 and structured as image data. 31 denotes a common library database developed in the hard disk unit 23. The common library database 31 stores graphic data referenced by the DTP software 21 and structured as vector data.

Reference numeral 32 denotes a superposition fetch common interface, which controls a registering unit 33, an enlarging/reducing unit 34, and superposing unit 35. The registering unit 33 registers vector data in the common library database 31. The enlarging/reducing unit 34 enlarges or reduces graphic data structured as vector data, and restructures the vector data into image data. The superposing unit 35 superposes image data on other image data, and registers the superposed image data in the DTP database 30.

Figure 3:
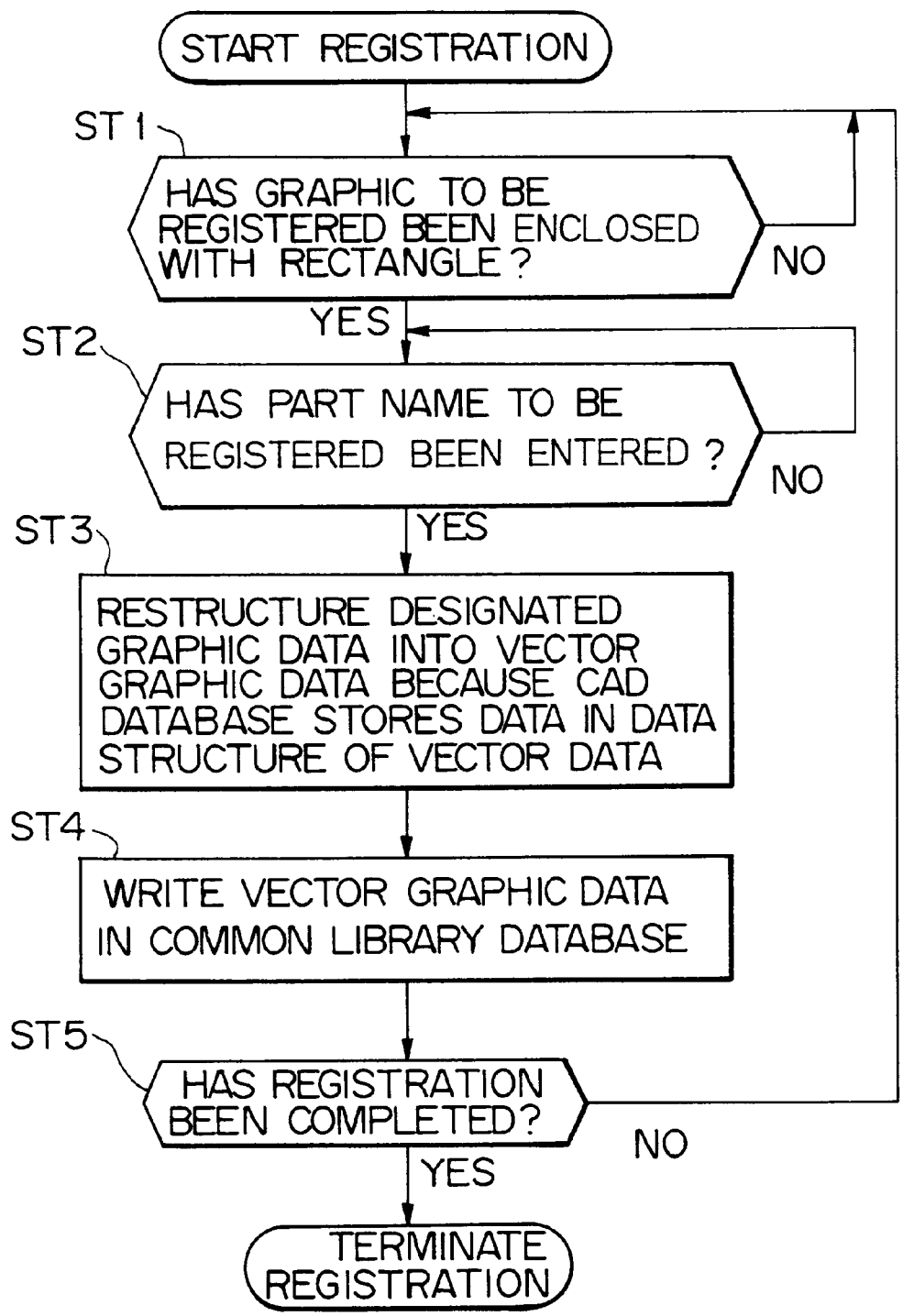
FIG. 3 shows a processing flow to be followed by a registering unit.
Figure 4:
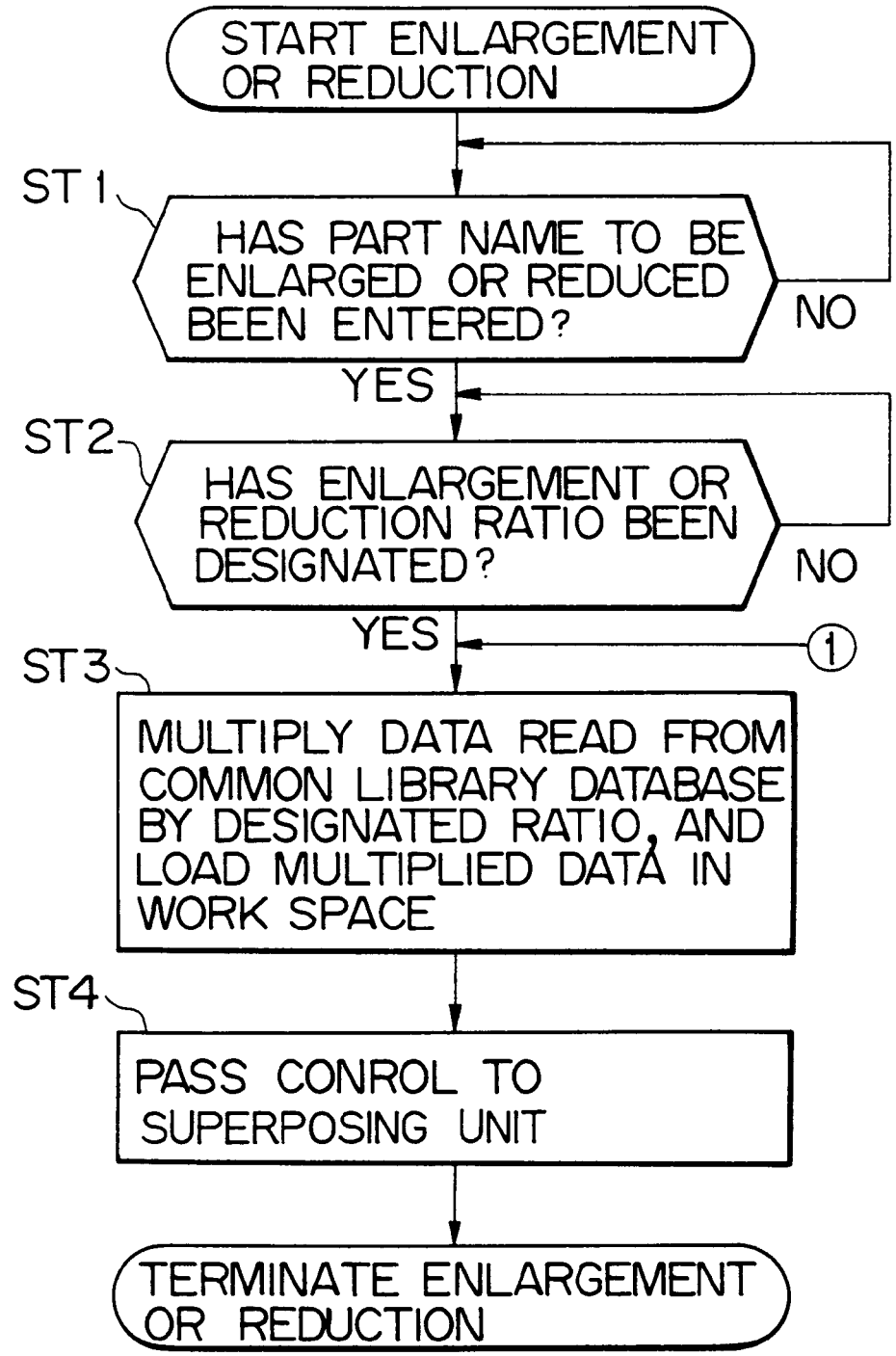
FIG. 4 shows a processing flow to be followed by an enlarging/reducing unit.
Figure 5:
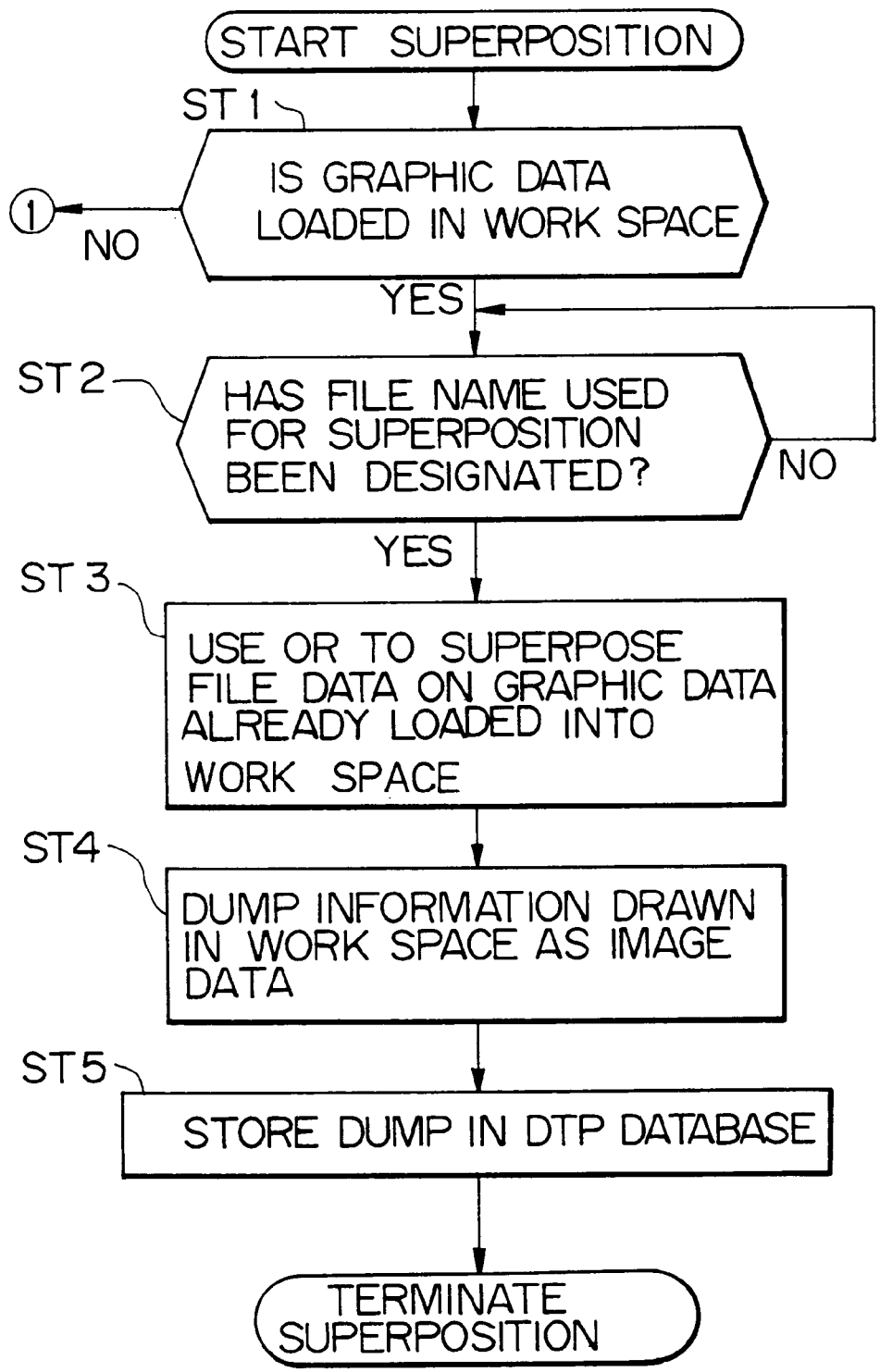
FIG. 5 shows a processing flow to be followed by a superposing unit.

FIG. 3 shows a processing flow followed by the registering unit 33. FIG. 4 shows a processing flow followed by the enlarging/reducing unit 34. FIG. 5 shows a processing flow followed by the superposing unit 35.

Next, the processing executed by the respective units will be described in detail according to the processing flows.

The registering unit 33, as shown in the processing flow of FIG. 3, detects at step 1 that a graphic data to be registered is designated by a rectangle drawn in a display screen using a mouse 24. At a step 2, the registering unit 33 waits until a part name to be registered in association with the graphic data to be registered is entered.

After a part name has been entered at the step 2, the graphic data designated at the step 1 is restructured into vector data at a step 3 because the CAD database 29 stores data as vector data. At a step 4, the restructured graphic data is written in the common library database 31. At a step 5, it is determined whether an end instruction has been issued for graphic data registration. If an end instruction has been issued, registration is terminated. If an end instruction has not been issued, control is returned to the step 1.

Figure 6:
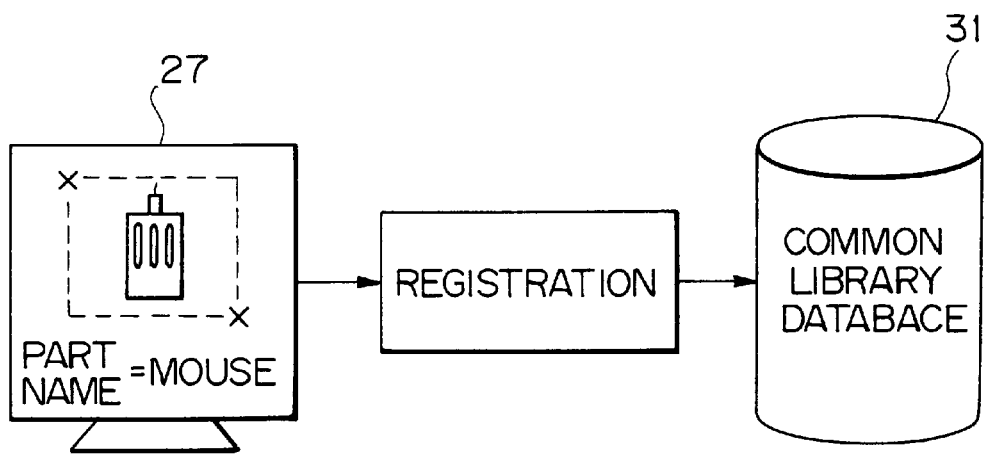
FIG. 6 is an explanatory diagram showing data registration into a common library database.

As mentioned above, according to the processing flow in FIG. 3, the registering unit 33 registers vector graphic data for CAD drawings, required by the DTP software 21, in the common library database 31 as shown in FIG. 6.

Figure 7A:
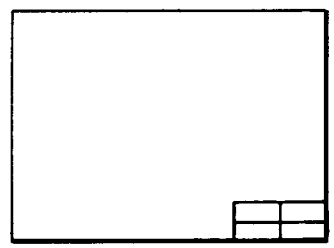
FIG. 7(a) shows an example (1) of graphic data to be registered in the common library database.
Figure 7B:
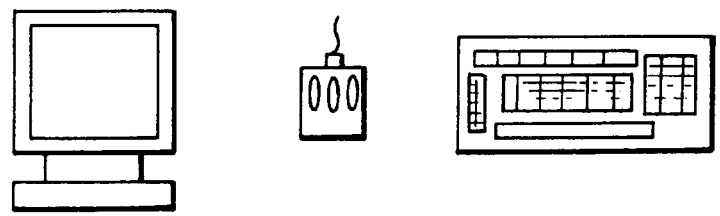
FIG. 7(b) shows an example (2) of graphic data to be registered in the common library database.
Figure 7C:
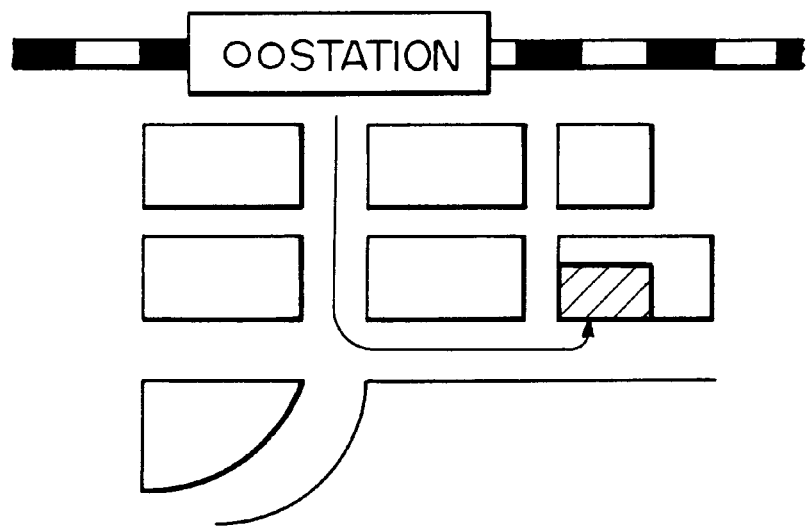
FIG. 7(c) shows an example (3) of graphic data to be registered in the common library database.

Graphic data to be registered in the common library database 31 includes any data used by the DTP software 21. It would be helpful to register such graphic data for CAD drawings that may be shared by various users; such as, outside lines of drawings in a drafting as shown in FIG. 7(a), workstation components as shown in FIG. 7(b), and map information as shown in FIG. 7(c). This is because once such data are registered in the common library database 31, they can be repeatedly used.

The enlarging/reducing unit 34, as shown in the processing flow of FIG. 4, detects at step 1 that a part name is entered for graphic data to be enlarged or reduced. At step 2, the enlarging/reducing unit 35 waits until an enlargement or reduction ratio is entered for the graphic data.

After the enlargement or reduction ratio has been entered at the step 2, graphic data, associated with the part name, is fetched from the common library database 31 and read at step 3. The vector graphic data is multiplied by the entered enlargement or reduction ratio, and then restructured into image data. The image data is then loaded in a work space (work area) set in the memory 22. At step 4, control is passed to the superposing unit 35. The processing is then terminated.

As mentioned above, according to the processing flow in FIG. 4, the enlarging/reducing unit 34 reads vector graphic data from the common library database 31, converts the vector data to data representing a size requested by the DTP software 21, restructures the vector data into image data, and then puts the image data into the work space in the memory 22.

The superposing unit 35, as shown in the processing flow in FIG. 5, detects at step 1 that graphic data has been loaded in the work space in the memory 22 (if graphic data has not been loaded, control is returned to the enlarging/reducing unit 34 or to step 1 in the processing flow in FIG. 4). At step 2, the superposing unit 35 waits until a file name of a file to be superposed on the graphic data is entered.

After a file name has been entered at the step 2, image data is read from the file with the entered file name in the DTP database at a step 3. An OR operation is used to superimpose or overwrite the image data on the graphic data loaded in the work space of the graphic data. At a step 4, the superposed image data, which has been produced in the work space, is dumped so that it will be re-formatted into file data for the DTP database 30. At a step 5, the file data is stored in the DTP database 30. The processing is then terminated.

As mentioned above, according to the processing flow in FIG. 5, the superposing unit 35 superposes graphic data, which has been structured as image data and converted to have a specified size, on image data registered in the DTP database 30 (image data representing document data, graphic data, or a combination of document data and graphic data). The superposing unit 35 then registers the superposed image data in the DTP database 30.

Figure 8B:
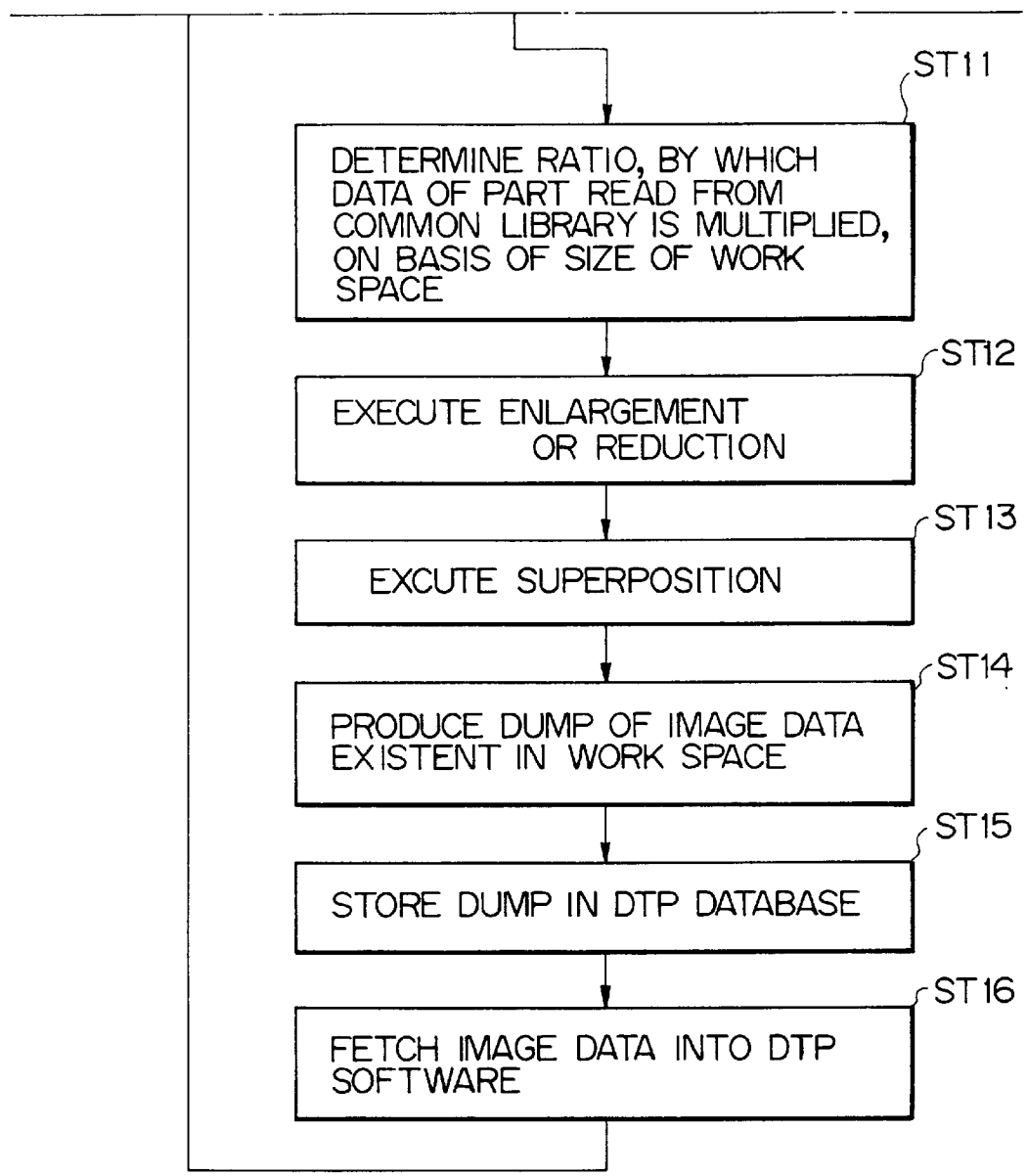

FIGS. 8(a) and 8(b) show the procedure executed by the document composition system of the present invention having the system configuration in FIG. 2. Document composition in the present invention will be described in detail according to the processing flow.

When executing a document composition, the document composition system first activates the DTP software 21 at step 1, as shown in the processing flow in FIG. 8(a). At step 2, it is determined whether the mouse 24 or keyboard 25 is operated for document composition. If the mouse 24 or keyboard 25 has been operated for document composition, a document is composed according to the specification entered by the operation. If a termination command is entered for document composition, control is passed to a step 3. The operation of the DTP software 21 is then terminated. All processing is thus terminated.

After document composition has been executed at step 2, it is determined at step 4 whether an image fetch request has been issued. If the request has been issued, it is determined at step 5 whether the request is a superposition fetch request for actuating the superposing unit 35. If it is determined at the step 5 that the request is not a superposition fetch request, control is passed to step 6. Through interaction with a user, it is determined which image data registered in the DTP database 30 should be fetched. The determined image data is fetched, and then control is returned to step 2.

If it is determined at step 5 that the request is a superposition fetch request, control is passed to step 7. Through interaction with a user, an image fetch space, into which graphic data is to be fetched, is set in a document. At a step 8, any of the part names of graphic data existing in the common library database 31, which is used for superposition, is designated through the interaction with the user. At a step 9, any of the file names of files existing in the DTP database 30, which is used for superposition, is designated through interaction with the user.

At step 10, a work space corresponding to the image fetch space set at step 7 is opened in the memory 22. Next, as shown in the processing flow in FIG. 8(b), at step 11, a ratio, by which the graphic data, existing in the common library database 31 specified by the part name designated at step 8, is to be multiplied, is determined on the basis of the size of the opened work space. At step 12, the graphic data is read from the common library database 31, enlarged or reduced according to the determined ratio, and then loaded in the work space. At step 13, the graphic data is superposed on the image data specified by the file name of a file existent in the DTP database 30 designated at the step 9.

A dump of the superposed image data, which has been developed in the work space, is then produced at step 14. Specifically, the image data is re-formatted into file data for the DTP database 30. At step 15, the file data is stored in the DTP database 30. At step 16, the DTP software 21 fetches the superposed image data from the DTP database 30 through interaction with the user, and then returns control to the step 2.

As mentioned above, according to the processing flow in FIG. 8, the document composition system of the present invention enlarges or reduces the vector graphic data of, for example, the image of a mouse in the common library database 31 as shown in FIG. 9. The enlarged or reduced vector graphic data is then superposed on the image data of the explanatory lines 1, 2, and 3, which resides in the DTP database 30, in the work space. The superposed image data is newly registered in the DTP database 30. The registered data is then fetched by the DTP software 21.

As mentioned above, according to the present invention, graphic data for CAD drawings is enlarged or reduced as vector data. The vector data is then restructured into image data. The image data is then fetched into the document composition software. The document composition software need not pass control to the CAD software. The document composition software can therefore fetch graphic data for CAD drawings efficiently and correctly.

In the aforesaid configuration, graphic data for CAD drawings needed by various users can be shared by the users, and developed and managed as image data. Thus, since the graphic data for CAD drawings can be used repeatedly, the document composition software can fetch the graphic data efficiently.

Furthermore, graphic data for CAD drawings can be superposed on another graphic data or graphic data can be superposed on document data. The document composition software can therefore fetch graphic data any one of a number of formats.

I claim:

1. A document composition system for composing a document, comprising:

CAD software;

DTP software; and common processing means for producing DTP graphic images used by the DTP software from CAD graphic images used by the CAD software, according to the demand from an operator, wherein said common processing means further comprises:

a first database for managing a first graphic images, as vector data produced by the CAD software, to be commonly used for a plurality of documents;

a second database for managing a second graphic images, as bit-map image data by the DTP software, to be inserted into the respective plurality of documents;

registering means for registering into the first database the first graphic images selected to be commonly used in the plurality of documents from CAD vector data used by the CAD software;

size changing means for changing the size of a respective first graphic image to be sized for composing a predetermined document, converting the size-changed graphic image into the corresponding a second graphic image used by the DTP software, and registering the second graphic image in the second database for a use of the DTP software.

2. A document composition system as in claim 1, wherein the size changing means changes the size of the graphic image managed in the first database by performing one of the group consisting of enlarging the graphic image managed by the first database by multiplying the corresponding vector data by a specified enlargement ratio, and reducing the graphic image managed by the first database by multiplying the corresponding vector data by a specified reduction ratio.

3. A document composition system as in claim 1, wherein graphic images managed by the first database are displayable on a display device, a document composition system user can select a respective graphic image managed by the first database for size-changing by the size changing means by displaying the graphic image on the display device and enclosing the graphic image in a rectangular zone, and the size changing means performs one of the group consisting of enlarging the enclosed graphic image to a designated size and reducing the enclosed graphic image to a designated size.

4. A document composition system for composing a document, comprising:

CAD software;

DTP software; and common processing means for producing DTP graphic images used by the DTP software from CAD graphic images used by the CAD software, according to the demand from an operator, wherein said common processing means further comprises:

a first database for managing a first graphic images, as vector data produced by the CAD software, to be commonly used for a plurality of documents;

a second database for managing a second graphic images, as bit-map image data used by the DTP software, to be inserted into the respective plurality of documents;

registering means for registering into the first database the first graphic images selected to be commonly used in the plurality of documents from the CAD vector data used by the CAD software;

size changing means for changing the size of a respective first graphic image to be sized for composing a predetermined document, and converting the size-changed graphic image into the corresponding second graphic image used by the DTP software; and superposing means for superposing the sized-changed second graphic image on selected graphic image or images from the second database to produce a superposed image, and registering the superposed image in the second database for a use of the DTP software.

5. A document composition system as in claim 4, wherein the size changing means changes the size of the graphic image managed in the first database by performing one of the group consisting of enlarging the graphic image managed by the first database by multiplying the corresponding vector data by a specified enlargement ratio, and reducing the graphic image managed by the first database by multiplying the corresponding vector data by a specified reduction ratio.

6. A document composition system as in claim 4, wherein graphic images managed by the first database are displayable on a display device, a document composition system user can select a respective graphic image managed by the first database for size-changing by the size changing means by displaying the graphic image on the display device and enclosing the graphic image in a rectangular zone, and the size changing means performs one of the group consisting of enlarging the enclosed graphic image to a designated size and reducing the enclosed graphic image to a designated size.

7. A document composition system as in claim 4, wherein the superposed image produced by the superposing means represents at least one of the group consisting of text information, graphic information, and a combination of text information and graphic information.

8. A document composition system as in claim 7, wherein the superposing means superposes the size-changed graphic image and the graphic image managed by the second database by using an OR operation to perform superposition.

9. A document composition system as in claim 7, wherein the superposing means superposes the size-changed graphic image and the graphic image managed by the second database by superposing a first document on a second document and performing overwriting so that only the first document will appear.

* * * * *